United States Patent [19]

Persha et al.

[11] 4,009,842
[45] Mar. 1, 1977

[54] SELF-ADJUSTING REEL

[75] Inventors: Thomas J. Persha, Juneau; David Jagielski, West Bend, both of Wis.

[73] Assignee: Bell & Howell Company, Chicago, Ill.

[22] Filed: Jan. 30, 1976

[21] Appl. No.: 653,820

[52] U.S. Cl. .................................................. 242/71.9
[51] Int. Cl.² ............................................ B65H 75/18
[58] Field of Search ........... 242/71.9, 71.8, 71.8 A, 242/73, 115, 116, 118.5, 77

[56] References Cited
UNITED STATES PATENTS

| | | | |
|---|---|---|---|
| 2,465,631 | 3/1949 | Bruestle | 242/71.9 |
| 3,025,016 | 3/1962 | De Boo | 242/71.9 |
| 3,432,113 | 3/1969 | Freedman | 242/71.8 A |
| 3,830,445 | 8/1974 | Moore | 242/71.9 |
| 3,840,198 | 10/1974 | Moore | 242/71.9 |

*Primary Examiner*—Edward J. McCarthy
*Attorney, Agent, or Firm*—Robert A. Walsh

[57] ABSTRACT

The inventive reel has two parts preferably made of plastic. One reel part comprises a first central hub section having a reel flange floatingly supported thereon, to move over the length of the first hub section between limits fixed by stops formed on opposite ends of the hub section. A parallel wire spring extends from the top of the first hub section to apply balanced forces against the floating flange, for biasing it to move toward the opposite reel flange. The second reel part comprises an integral flange and a second hub section upstanding thereon. A socket in the top of the second hub section seatingly receives the bottom of the first hub section. The reel is primarily designed for use with a tape or film strip which has a stiff leader which is slightly wider than the film itself. When the leader is placed between the two flanges, the floating flange must move against the urging of the wire spring to a spacing which securely captures the leader and loosely receives the tape or film between the flanges. The first reel, which has the floating flange, is removable from the assembly leaving the second reel which may be utilized in the threading of film which does not include a stiff leader required for automatic threading.

8 Claims, 3 Drawing Figures

SELF-ADJUSTING REEL

This invention relates to reels and more particularly — but not exclusively — to reels for microfilm.

As used herein, the term "film" has a generic meaning, to describe almost any kind of elongated and tape-like object. Therefore, the term is to be construed broadly enough to cover photographic film, magnetic recording tape, paper or sealing tape, or any other similar structure. Also, the particular reel which is described herein is especially useful on a microfilm reader; however, it may also be used on any other similar device. Therefore, the references to a microfilm reader are to be construed broadly enough to refer to any suitable device.

The inventive reel may find particular utility wherever it is necessary to reel film having any of many different widths. The invention also has a particularly usefulness when it is either necessary or desirable to thread a film with either a quick manual action or responsive to an automatic threader action. However, the reel may also be used with machines using any kind of threading techniques.

Accordingly, an object of the invention is to provide a universal reel which may be used in conjunction with film having any one of many different widths. Here, an object is to provide a reel which is primarily useful with a specific film width, such as 16 mm or 35 mm microfilm, but which is also useful with any of many other films.

Another object is to accomplish these objects with an extremely low cost reel, having a simple and reliable design.

In keeping with an aspect of the invention, these and other objects are accomplished by a two part reel comprising a first central hub section having a floating flange mounted thereon. The flange may move to any convenient location along the length of the hub and between limits established by stops formed on opposite ends of the hub section. The floating flange is spring biased toward the opposite reel flange. A second reel part comprises the opposite flange with an integral hub section upstanding thereon. The bottom of the first hub section seats in a socket in the top of the second hub section, in a position where the two flanges have a spaced parallel relationship. The reel is primarily designed to take up a film strip which has a stiff leader that is slightly wider than the film itself, so that the leader is securely captured between the two flanges.

The nature of a preferred embodiment is shown in the attached drawings, wherein.

Figure 1:
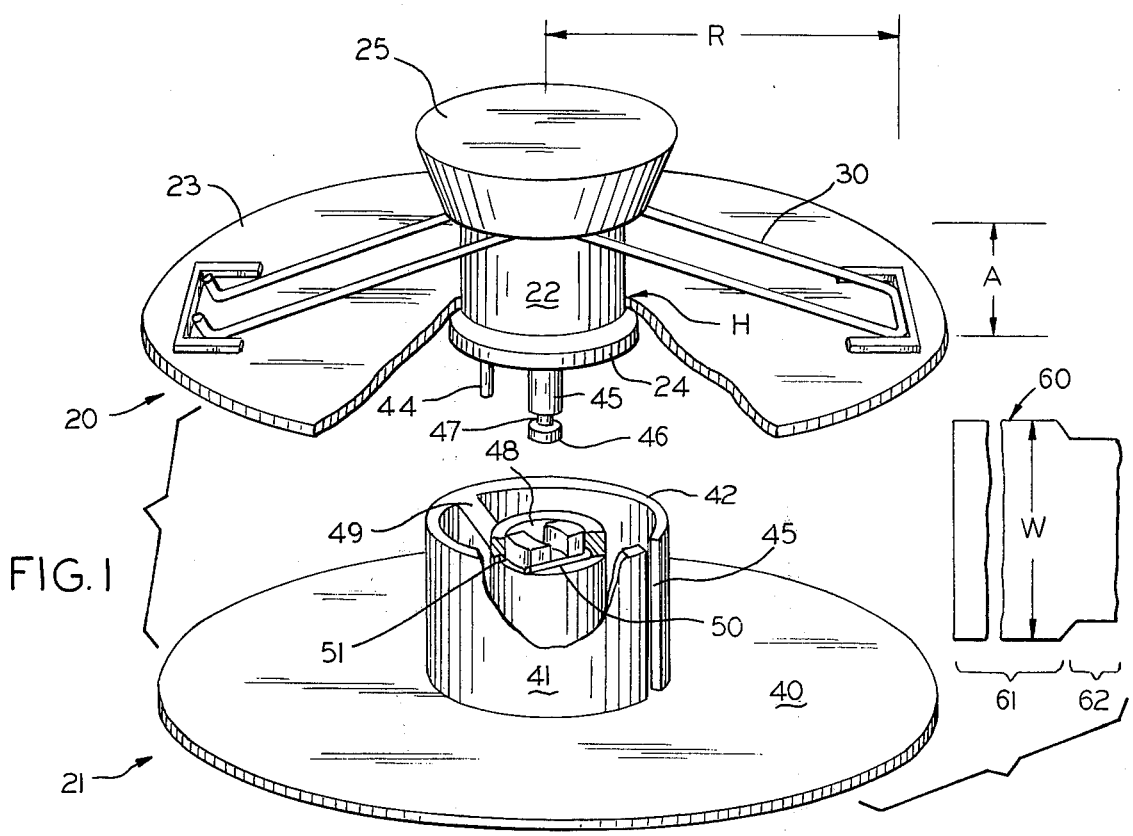
FIG. 1 is an exploded and partially broken away perspective view of an inventive reel, together with an end of the film, having a leader attached thereto.

As best seen in FIG. 1, the inventive reel has two parts 20, 21, both of which are preferably made of plastic. Part 20 comprises a first and central hub section 22 having a reel flange 23 floatingly supported thereon. Flange 23 has a central hole H with a diameter which moves easily over the hub 22 and along the length A, which hub has a reduced diameter as compared to the diameter of hole H. The upper and lower ends of the hub 22 terminate in larger diameter sections at 24, 25 to form limit stops for restricting the movement of the floating flange 23.

A parallel wire spring 30 extends in opposing directions from the top 25 of the hub section to the floating flange 23. This spring 30 biases the floating flanges 23 toward the opposite reel flange 40. As the flange 23 moves over the hub 22 and along the distance A, the free ends of spring 30 slide over the flange surface.

There are a number of important design considerations in this spring arrangement. First, the wire spring may be precisely made in a simple and inexpensive manner, to apply an extremely predictable force. The spring 30 applies bias forces which are easily controllable to within small fractions of a gram. Second, the spring bias forces are applied to floating flange 23, at widely spaced points which are a substantial distance (Radius R) away from the center of the hub. Moreover, the ends of the wire spring 30 may be spread apart to apply uniform bias forces, which may be balanced around the circumference of the flange 23. Thus, it is easy to maintain the flanges at an accurately spaced parallel relationship, as compared to the difficulty of maintaining such parallelism when a spring must be contained within the hub area. This parallelism of flanges and perpendicular relationship between hub and flange leads to a more uniform and trouble-free film winding.

The second reel part 21 comprises an integral flange 40 with a second hub section 41 upstanding thereon. A socket 42 is formed in the top of the second hub section 41, to seatingly receive the bottom 24 of the first hub section.

The base 24 of hub part 22 and a socket in the top of hub part 41 have complementary contours and fasteners. More particularly, depending from hub 22 is an indexing pin 44 and a latching pin 45. The indexing pin 44 fits inside hub 41 and against any suitable stop, such as flange 49, to keep parts 20, 21 from turning relative to each other. Latching pin 45 terminates in knob 46 and is defined by its section 47 with reduced diameter. The latching pin has contours which fit snuggly into a central hole 48 on the top of hub 41. Inside the hole 48 are a pair of oppositely disposed spring loaded detents 50, 51. When the base 24 of hub section 22 is fitted into socket 42, knob 46 passes the detents 50, 51 which then snap into the reduced circumferential groove of section 47, to latch the parts 20, 21 together.

The reel is primarily designed for use with a tape or film strip 60 having a stiff leader portion 61 which is slightly wider than the film 62. When the leader 61 is placed between the two flanges 23, 40, the floating flange 23 must move upwardly (as viewed in FIG. 1) against the urging of the wire spring 30. The leader 61 is securely captured between the flanges, responsive to the bias of spring 30. Thereafter, the reel may be rotated, to wind the film 62 into the space between the flanges.

Figure 2:
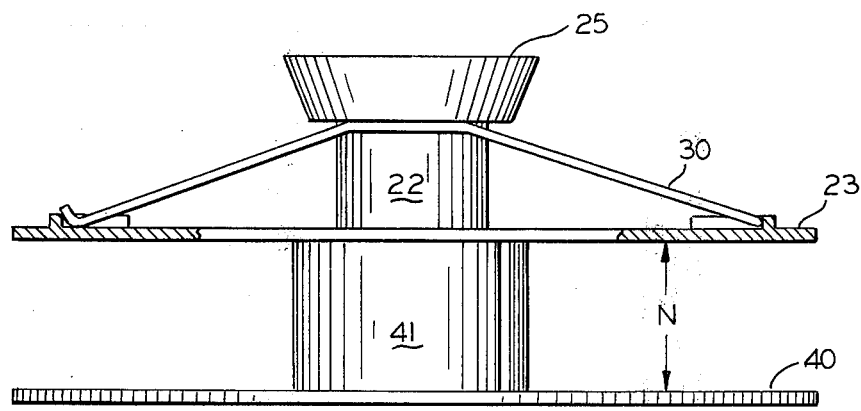
FIG. 2 is a side elevation view showing the reel with the floating flange in a position for accepting and storing a relatively narrow film.
Figure 3:
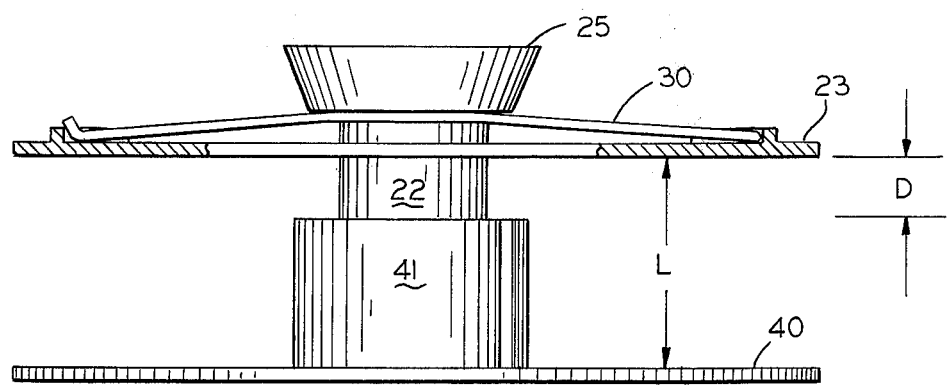
FIG. 3 is a similar side elevation view showing the reel with the floating flange in a position for accepting and storing a relatively wide film.

The operation of the inventive reel is shown in FIGS. 2, 3. If the width W of the leader 61 (and therefore of film 62) is relatively narrow, the spring 30 urges the floating flange 23 toward the opposite flange 40, to form a relatively narrow space N. The leader is captured and the film is thereafter wound upon hub 41, in the narrow space N. However, if the width W of the leader (and therefore the film) is relatively wide, flange 23 is urged (against the bias of spring 30) away from flange 40 to form a relatively large space L for receiving a large film. It should be apparent that the film wound on the reel of FIG. 3 is wider (by a factor of D) than the film wound on the reel of FIG. 2.

The invention provides many advantages over the prior art. The flanges tend to remain in a spaced parallel relationship at all times since the widely spaced pressure, precisely applied by the wire spring, may be carefully adjusted. While the drawing shows an application of spring bias at four points, any suitable number of springs may be provided. Thus, equally weighted forces preserve the parallelism of the flanges. The leader is positively captured and the film feeds freely and smoothly into and out of its wound position, upon the hub 41.

Those who are skilled in the art will readily perceive how modifications may be made, without departing from the invention. Therefore, the appended claims should be construed broadly enough to cover all equivalent structures, which fall within the true spirit and scope of the invention.

I claim:

1. An automatically self-adjusting reel having two parts, one of said two parts comprising a first central hub section having a reel flange floatingly supported thereon, to move over the length of and between limit stops formed on opposite ends of the first central hub section, at least a parallel wire spring extending from the top of the first hub section outwardly toward the floating flange for biasing it at four points to urge it to move toward a flange formed on the other of said two parts, said spring extending outwardly from said hub for a distance substantially greater than the diameter of said hub to uniformly apply balanced forces against said flange.

2. The reel of claim 1 wherein the second of said two reel parts comprises a second flange with a second hub section integrally upstanding thereon, a socket formed in the second hub section for seatingly receiving the first hub section, and means for securing together said two reel parts in an orientation where said balanced forces hold the two flanges in a spaced parallel relationship.

3. The reel of claim 2 wherein said reel is for use with an elongated strip which has a stiff leader that is slightly wider than the strip itself, whereby when the leader is placed between the two flanges, the floating flange is forced to move away from said second flange against the urging of the wire spring to securely capture the tape or film between the flanges.

4. The reel of claim 3 wherein said securing means comprises a first fastener formed on said one part and a complementary fastener formed in the second of said two parts, and indexing means for preventing said two parts from turning relative to each other.

5. The reel of claim 4 wherein said first fastener comprises a shaft with a knob formed on the end thereof and said complementary fastener comprises means in a hole for snapping over said knob to capture and secure said shaft therein.

6. The reel of claim 4 wherein said indexing means comprises a pin and a stop for precluding rotation of said two parts, relative to each other, when said dependent shaft is captured by said complementary fastener.

7. The reel of claim 6 wherein said first hub section comprises an elongated portion of a first diameter terminated at opposite ends by portions of enlarged diameters which form said limit stops, said floating flange having a center hole with a diameter slightly more than said first diameter, whereby said floating flange slides over said portion of said first diameter.

8. The reel of claim 7 wherein said two reel parts are molded plastic parts.

* * * * *